United States Patent
Kakihara et al.

(10) Patent No.: US 9,424,681 B2
(45) Date of Patent: Aug. 23, 2016

(54) INFORMATION PROCESSING DEVICE, INFORMATION PROCESSING METHOD, AND PROGRAM

(75) Inventors: Toshimasa Kakihara, Kanagawa (JP); Takeo Ugai, Kanagawa (JP); Nobuyuki Minami, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 333 days.

(21) Appl. No.: 13/819,779

(22) PCT Filed: Sep. 1, 2011

(86) PCT No.: PCT/JP2011/069882
§ 371 (c)(1),
(2), (4) Date: Feb. 28, 2013

(87) PCT Pub. No.: WO2012/032996
PCT Pub. Date: Mar. 15, 2012

(65) Prior Publication Data
US 2013/0169630 A1     Jul. 4, 2013

(30) Foreign Application Priority Data

Sep. 9, 2010   (JP) ................................ 2010-202042

(51) Int. Cl.
*G06T 15/08*     (2011.01)
*G06F 3/048*     (2013.01)
(Continued)

(52) U.S. Cl.
CPC ............ *G06T 15/08* (2013.01); *G06F 3/0338* (2013.01); *G06F 3/0362* (2013.01); *G06F 3/04815* (2013.01); *G06T 15/20* (2013.01); *G06T 19/00* (2013.01)

(58) Field of Classification Search
CPC combination set(s) only.
See application file for complete search history.

(56) References Cited

U.S. PATENT DOCUMENTS

| 2005/0225559 | A1* | 10/2005 | Robertson | G06T 15/20 345/581 |
| 2009/0275412 | A1* | 11/2009 | Green | G07F 17/3274 463/42 |
| 2009/0282331 | A1* | 11/2009 | Nagasaka | G06F 3/014 715/701 |

(Continued)

FOREIGN PATENT DOCUMENTS

| JP | 2008-067875 | * | 3/2008 | ............. A63F 13/00 |
| JP | 2008-67875 | | 3/2008 | |

OTHER PUBLICATIONS

Dark Chronicle, Sony Computer Entertainment Inc., Feb. 2, 2005, 6, 20.
Wild Arms the Vth Vanguard, Sony Computer Entertainment Inc., Dec. 1, 2006, 25.

*Primary Examiner* — Yuwen Pan
*Assistant Examiner* — Zhitong Chen
(74) *Attorney, Agent, or Firm* — Frommer Lawrence & Haug LLP; William S. Frommer

(57) ABSTRACT

The present invention relates to an information processing device, an information processing method, and a program for realizing an intuitive operation to issue an instruction to move an object in a virtual three-dimensional space or the like, to an operator who performs operations while looking at an image of the virtual three-dimensional space.

The information processing device in this disclosure includes a control unit that controls a CG image generating unit in response to an input of parameters of three axial directions through a three-dimensional operating unit. The control unit changes the amount of control of the CG image generating unit in accordance with the input parameters, to cause an image of the virtual three-dimensional space to vary between where a virtual camera is associated with the three-dimensional operating unit and where an object is associated with the three-dimensional operating unit. This disclosure can be applied to a video editing device for editing broadcast video images.

7 Claims, 15 Drawing Sheets

| | | | | |
|---|---|---|---|---|
| (51) | Int. Cl. | | (56) | References Cited |
| | G06T 19/00 | (2011.01) | | U.S. PATENT DOCUMENTS |
| | G06T 15/20 | (2011.01) | | |
| | G06F 3/0338 | (2013.01) | 2010/0020080 A1* 1/2010 Iwanaga ................ G06T 15/60 |
| | G06F 3/0362 | (2013.01) | | 345/426 |
| | G06F 3/0481 | (2013.01) | * cited by examiner | |

FIG. 3

| OPERATION TYPE | TO BE OPERATED | |
|---|---|---|
| | VIRTUAL CAMERA | OBJECT |
| ENLARGING/ REDUCING | NOT ALLOWED | ALLOWED |
| THREE-DIMENSIONAL MOVING | ALLOWED | ALLOWED |
| ROTATING | ALLOWED | ALLOWED |
| ROTATIONAL-AXIS MOVING | ALLOWED | NOT ALLOWED |
| ASPECT RATIO CHANGING | ALLOWED | NOT ALLOWED |
| DISTORTING | ALLOWED | NOT ALLOWED |
| PERSPECTIVE | ALLOWED | NOT ALLOWED |
| TWO-DIMENSIONAL MOVING | ALLOWED | NOT ALLOWED |

FIG. 4

CORRESPONDENCE BETWEEN OPERATIONS AND PARAMETERS WHERE VIRTUAL CAMERA IS TO BE OPERATED

| COORDINATE MODE | OPERATION MODE | X | Y | Z |
|---|---|---|---|---|
| src | axisloc | TrnsLAxisLoc | TrnsLAxisLoc | TrnsLAxisLoc*-1 |
| src | asp | TrnsPreRateX | TrnsPreRateY | TrnsPreAspect |
| src | Locsize | TrnsLSrcLoc | TrnsLSrcLoc | TrnsPreSize |
| src | Locxyz | TrnsLSrcLoc | TrnsLSrcLoc | TrnsLSrcLoc*-1 |
| src | Rot | TrnsSrcRot | TrnsSrcRot | TrnsSrcRot |
| src | shift asp | TrnsSkewX | TrnsSkewY | TrnsPreAspect |
| src | shift rot | TrnsLSrcSpin | TrnsLSrcSpin | TrnsLSrcSpin |
| tgt | asp | TrnsLViewX | TrnsLViewY | TrnsLPersZ |
| tgt | Locsize | TrnsLPstLocX | TrnsLPstLocY | TrnsLPstSize |
| tgt | Locxyz | TrnsLTgtLoc | TrnsLTgtLoc | TrnsLTgtLoc*-1 |
| tgt | Rot | TrnsTgtRot | TrnsTgtRot | TrnsTgtRot |
| tgt | shift rot | TrnsLTgtSpin | TrnsLTgtSpin | TrnsLTgtSpin |

FIG. 5

CORRESPONDENCE BETWEEN OPERATIONS AND PARAMETERS WHERE OBJECT IS TO BE OPERATED

| COORDINATE MODE | OPERATION MODE | X | Y | Z |
|---|---|---|---|---|
| src | axisloc | | | |
| src | asp | | | srcScaleZ |
| src | Locsize | srcMoveX | srcMoveY | srcScaleXYZ |
| src | Locxyz | srcMoveX | srcMoveY | srcMoveZ*-1 |
| src | Rot | srcRotateX | srcRotateY | srcRotateZ |
| src | shift_asp | srcScaleX | srcScaleY | srcScaleZ |
| src | shift_rot | srcRotateX | srcRotateY | srcRotateZ |
| tgt | asp | tgtScaleX | tgtScaleY | tgtScaleZ |
| tgt | Locsize | tgtMoveX | tgtMoveY | tgtScaleXYZ |
| tgt | Locxyz | tgtMoveX | tgtMoveY | tgtMoveZ*-1 |
| tgt | Rot | tgtRotateX | tgtRotateY | tgtRotateZ |
| tgt | shift_rot | tgtRotateX | tgtRotateY | tgtRotateZ |

FIG. 6

| COORDINATE MODE | OPERATION MODE | CORRESPONDENCE BETWEEN OPERATIONS AND MOVEMENTS WHERE OBJECT IS TO BE OPERATED | | |
|---|---|---|---|---|
| | | X | Y | Z |
| src | axisloc | | | |
| src | asp | | | |
| src | Locsize | X-MOVEMENT IN src COORDINATES | Y-MOVEMENT IN src COORDINATES | ENLARGEMENT IN Z-DIRECTION IN src COORDINATES |
| src | Locxyz | X-MOVEMENT IN src COORDINATES | Y-MOVEMENT IN src COORDINATES | ENLARGEMENT IN X-, Y-, AND Z- DIRECTIONS IN src COORDINATES |
| src | Rot | ROTATION IN X-DIRECTION IN src COORDINATES | ROTATION IN Y-DIRECTION IN src COORDINATES | Z-MOVEMENT*-1 IN src COORDINATES |
| src | shift asp | ENLARGEMENT IN X-DIRECTION IN src COORDINATES | ENLARGEMENT IN Y-DIRECTION IN src COORDINATES | ROTATION IN Z-DIRECTION IN src COORDINATES |
| src | shift rot | ROTATION IN X-DIRECTION IN src COORDINATES | ROTATION IN Y-DIRECTION IN src COORDINATES | ENLARGEMENT IN Z-DIRECTION IN src COORDINATES |
| tgt | asp | ENLARGEMENT IN X-DIRECTION IN tgt COORDINATES | ENLARGEMENT IN Y-DIRECTION IN tgt COORDINATES | ROTATION IN Z-DIRECTION IN tgt COORDINATES |
| tgt | Locsize | X-MOVEMENT IN tgt COORDINATES | Y-MOVEMENT IN tgt COORDINATES | ENLARGEMENT IN Z-DIRECTION IN tgt COORDINATES |
| tgt | Locxyz | X-MOVEMENT IN tgt COORDINATES | Y-MOVEMENT IN tgt COORDINATES | ENLARGEMENT IN X-, Y-, AND Z- DIRECTIONS IN tgt COORDINATES |
| tgt | Rot | ROTATION IN X-DIRECTION IN tgt COORDINATES | ROTATION IN Y-DIRECTION IN tgt COORDINATES | Z-MOVEMENT*-1 IN tgt COORDINATES |
| tgt | shift rot | ROTATION IN X-DIRECTION IN tgt COORDINATES | ROTATION IN Y-DIRECTION IN tgt COORDINATES | ROTATION IN Z-DIRECTION IN tgt COORDINATES |

FIG. 7

CORRESPONDENCE BETWEEN OPERATIONS AND MOVEMENTS WHERE OBJECT IS TO BE OPERATED.

| COORDINATE MODE | OPERATION MODE | X | Y | Z |
|---|---|---|---|---|
| src | axisloc | X-MOVEMENT IN src COORDINATES | Y-MOVEMENT IN src COORDINATES | Z-MOVEMENT*-1 IN src COORDINATES |
| src | asp | ENLARGEMENT IN X-DIRECTION IN src COORDINATES | ENLARGEMENT IN Y-DIRECTION IN src COORDINATES | ENLARGEMENT IN Z-DIRECTION IN src COORDINATES |
| src | Locsize | X-MOVEMENT IN src COORDINATES | Y-MOVEMENT IN src COORDINATES | ENLARGEMENT IN X-, Y-, AND Z-DIRECTIONS IN src COORDINATES |
| src | Locxyz | X-MOVEMENT IN src COORDINATES | Y-MOVEMENT IN src COORDINATES | Z-MOVEMENT*-1 IN src COORDINATES |
| src | Rot | ROTATION IN X-DIRECTION IN src COORDINATES | ROTATION IN Y-DIRECTION IN src COORDINATES | ROTATION IN Z-DIRECTION IN src COORDINATES |
| src | shift asp | ENLARGEMENT IN X-DIRECTION IN src COORDINATES | ENLARGEMENT IN Y-DIRECTION IN src COORDINATES | ENLARGEMENT IN Z-DIRECTION IN src COORDINATES |
| src | shift rot | ROTATION IN X-DIRECTION IN src COORDINATES | ROTATION IN Y-DIRECTION IN src COORDINATES | ROTATION IN Z-DIRECTION IN src COORDINATES |
| tgt | asp | ENLARGEMENT IN X-DIRECTION IN tgt COORDINATES | ENLARGEMENT IN Y-DIRECTION IN tgt COORDINATES | ENLARGEMENT IN Z-DIRECTION IN tgt COORDINATES |
| tgt | Locsize | X-MOVEMENT IN tgt COORDINATES | Y-MOVEMENT IN tgt COORDINATES | ENLARGEMENT IN X-, Y-, AND Z-DIRECTIONS IN tgt COORDINATES |
| tgt | Locxyz | X-MOVEMENT IN tgt COORDINATES | Y-MOVEMENT IN tgt COORDINATES | Z-MOVEMENT*-1 IN tgt COORDINATES |
| tgt | Rot | ROTATION IN X-DIRECTION IN tgt COORDINATES | ROTATION IN Y-DIRECTION IN tgt COORDINATES | ROTATION IN Z-DIRECTION IN tgt COORDINATES |
| tgt | shift rot | ROTATION IN X-DIRECTION IN tgt COORDINATES | ROTATION IN Y-DIRECTION IN tgt COORDINATES | ROTATION IN Z-DIRECTION IN tgt COORDINATES |

FIG. 10
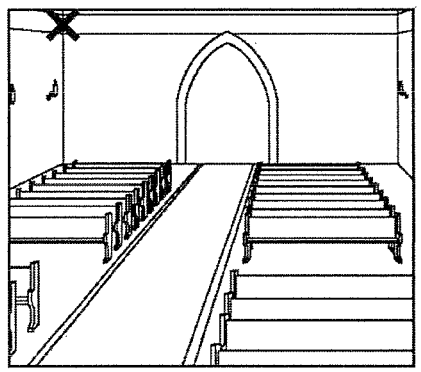
A
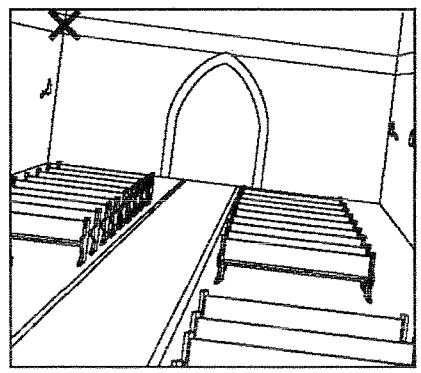
B

INFORMATION PROCESSING DEVICE, INFORMATION PROCESSING METHOD, AND PROGRAM

TECHNICAL FIELD

This disclosure relates to an information processing device, an information processing method, and a program, and more particularly, to an information processing device, an information processing method, and a program for enabling an intuitive operation to display a virtual three-dimensional space formed with CG (computer graphics) by using a joystick or the like.

BACKGROUND ART

There have been systems that are capable of moving, turning around, and rotating the position of an object, the coordinates of a control point, the position of a virtual camera, and the like in a virtual three-dimensional space formed with CG, by using an operation input device such as a joystick (see Patent Document 1, for example).

CITATION LIST

Patent Document

Patent Document 1: Japanese Patent Application Laid-Open No. 2003-265858

SUMMARY OF THE INVENTION

Problems to be Solved by the Invention

However, the conventional systems might cause the following problems. For example, when an operator tilts the joystick to the right so as to move an object to the right in a virtual three-dimensional space displayed on a screen, the object does not necessarily move to the right on the screen, depending on the position of a virtual camera. That is, the direction in which an object moves on the screen varies depending on the relationship between the virtual camera and the axes of the coordinates indicating the position of the object. Therefore, it is difficult for the conventional systems to perform an intuitive operation to move an object in a virtual three-dimensional space or the like.

This disclosure has been made in view of those circumstances, and an object thereof is to realize an intuitive operation for issuing an instruction to move an object in a virtual three-dimensional space or the like, to an operator who performs operations while looking at an image of the virtual three-dimensional space.

Solution to Problems

An information processing device as an aspect of this disclosure includes: a CG image generating unit that performs real-time rendering of a CG image, based on CG descriptive data that defines contents of a virtual three-dimensional space formed with CG; a three-dimensional operating unit for inputting parameters of three axial directions perpendicular to one another; an associating unit that associates a virtual camera or an object in the virtual three-dimensional space as an object to be controlled with the three-dimensional operating unit; a coordinate mode selecting unit that selects a target system or a source system as a coordinate mode indicating the coordinate system of an operation using the three-dimensional operating unit; and a control unit that, in response to the input of the parameters of the three axial directions through the three-dimensional operating unit, controls the CG image generating unit to cause an image of the virtual three-dimensional space to vary between where the virtual camera is associated with the three-dimensional operating unit and where the object is associated with the three-dimensional operating unit, the variation being caused by changing the amount of control of the CG image generating unit in accordance with the input parameters.

In response to the input of the parameters of the three axial directions through the three-dimensional operating unit, the control unit controls the CG image generating unit to cause the image of the virtual three-dimensional space to vary between where the virtual camera is associated with the three-dimensional operating unit and where the object is associated with the three-dimensional operating unit, the variation being caused by reversing the sign of the amount of control of the CG image generating unit in accordance with the input parameters.

The information processing device as an aspect of this disclosure may further include an operation mode selecting unit that selects, as an operation mode using the three-dimensional operating unit, Locsize, locxyz, Rot, Axisloc, asp, shift asp, or shift rot.

The three-dimensional operating unit can perform different kinds of operations between where the virtual camera is associated as an object to be controlled with the three-dimensional operating unit and where the object is associated with the three-dimensional operating unit.

The information processing device as an aspect of this disclosure may further include a presenting unit that shows an operator the amount of control corresponding to the parameters input through the three-dimensional operating unit.

The associating unit may associate the virtual camera or objects in the virtual three-dimensional space with the three-dimensional operating unit.

The three-dimensional operating unit may also serve as a user interface of digital special effect equipment.

An information processing method as an aspect of this disclosure is an information processing method to be performed by an information processing device that includes: a CG image generating unit that performs real-time rendering of a CG image, based on CG descriptive data that defines contents of a virtual three-dimensional space formed with CG; and a three-dimensional operating unit for inputting parameters of three axial directions perpendicular to one another. The information processing method includes: an associating step of associating a virtual camera or an object in the virtual three-dimensional space as an object to be controlled with the three-dimensional operating unit; a coordinate mode selecting step of selecting a target system or a source system as a coordinate mode indicating the coordinate system of an operation using the three-dimensional operating unit; and a control step of, in response to the input of the parameters of the three axial directions through the three-dimensional operating unit, controlling the CG image generating unit to cause an image of the virtual three-dimensional space to vary between where the virtual camera is associated with the three-dimensional operating unit and where the object is associated with the three-dimensional operating unit, the variation being caused by changing the amount of control of the CG image generating unit in accordance with the input parameters.

A program as an aspect of this disclosure causes a computer to function as: a CG image generating unit that performs real-time rendering of a CG image, based on CG descriptive data defining contents of a virtual three-dimensional space formed with CG; a three-dimensional operating unit for inputting parameters of three axial directions perpendicular to one another; an associating unit that associates a virtual camera or an object in the virtual three-dimensional space as an object to be controlled with the three-dimensional operating unit; a coordinate mode selecting unit that selects a target system or a source system as a coordinate mode indicating the coordinate system of an operation using the three-dimensional operating unit; and a control unit that, in response to the input of the parameters of the three axial directions through the three-dimensional operating unit, controls the CG image generating unit to cause an image of the virtual three-dimensional space to vary between where the virtual camera is associated with the three-dimensional operating unit and where the object is associated with the three-dimensional operating unit, the variation being caused by changing the amount of control of the CG image generating unit in accordance with the input parameters.

In an aspect of this disclosure, a virtual camera or an object in a virtual three-dimensional space is associated as an object to be controlled with a three-dimensional operating unit, and a target system or a source system is selected as a coordinate mode indicating the coordinate system of an operation using the three-dimensional operating unit. Also, in response to an input of parameters of three axial directions through the three-dimensional operating unit, a CG image generating unit is controlled. The amount of control of the CG image generating unit in accordance with the input parameters is changed to cause an image of the virtual three-dimensional space to vary between where the virtual camera is associated with the three-dimensional operating unit and where the object is associated with the three-dimensional operating unit.

Effects of the Invention

According to an aspect of this disclosure, it is possible to realize an intuitive operation for issuing instruction to move an object in a virtual three-dimensional space or the like, to the operator who performs operations while looking at an image of the virtual three-dimensional space. Accordingly, instantaneous, high value-added video images can be generated.

BRIEF DESCRIPTION OF DRAWINGS

FIG. 3 is a diagram showing operations that can be or cannot be performed with a joystick.

FIG. 4 is a diagram showing parameters that are changed in accordance with an operation of the joystick in a case where a virtual camera is to be operated.

FIG. 5 is a diagram showing parameters that are changed in accordance with an operation of the joystick in a case where an object is to be operated.

FIG. 6 is a diagram showing movement of an object in accordance with an operation of the joystick in a case where the object is to be operated.

FIG. 7 is a diagram showing movement of an object in accordance with an operation of the joystick in a case where the object is to be operated.

FIG. 10 is a diagram showing exemplary screen displays for explaining a rotating operation performed by changing TrnsPstRotation in matFrWF2D.

MODE FOR CARRYING OUT THE INVENTION

In the following, best modes (hereinafter referred to as embodiments) for carrying out this disclosure will bed described in detail with reference to the accompanying drawings.

1. Embodiment

[Exemplary Configuration of a Video Editing Device]

Figure 1:
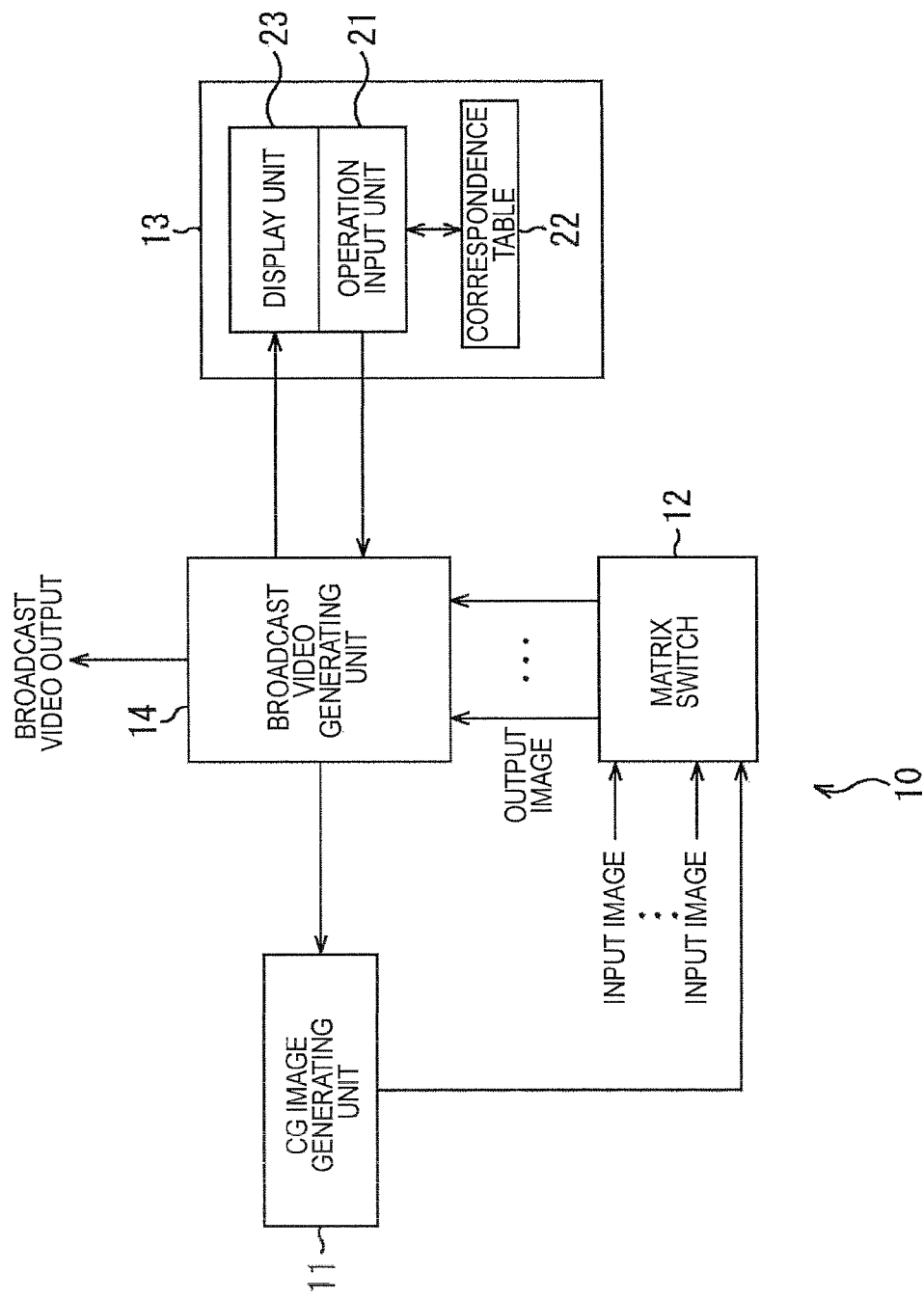
FIG. 1 is a block diagram showing an exemplary configuration of a video editing device to which this disclosure is applied.
Figure 2:
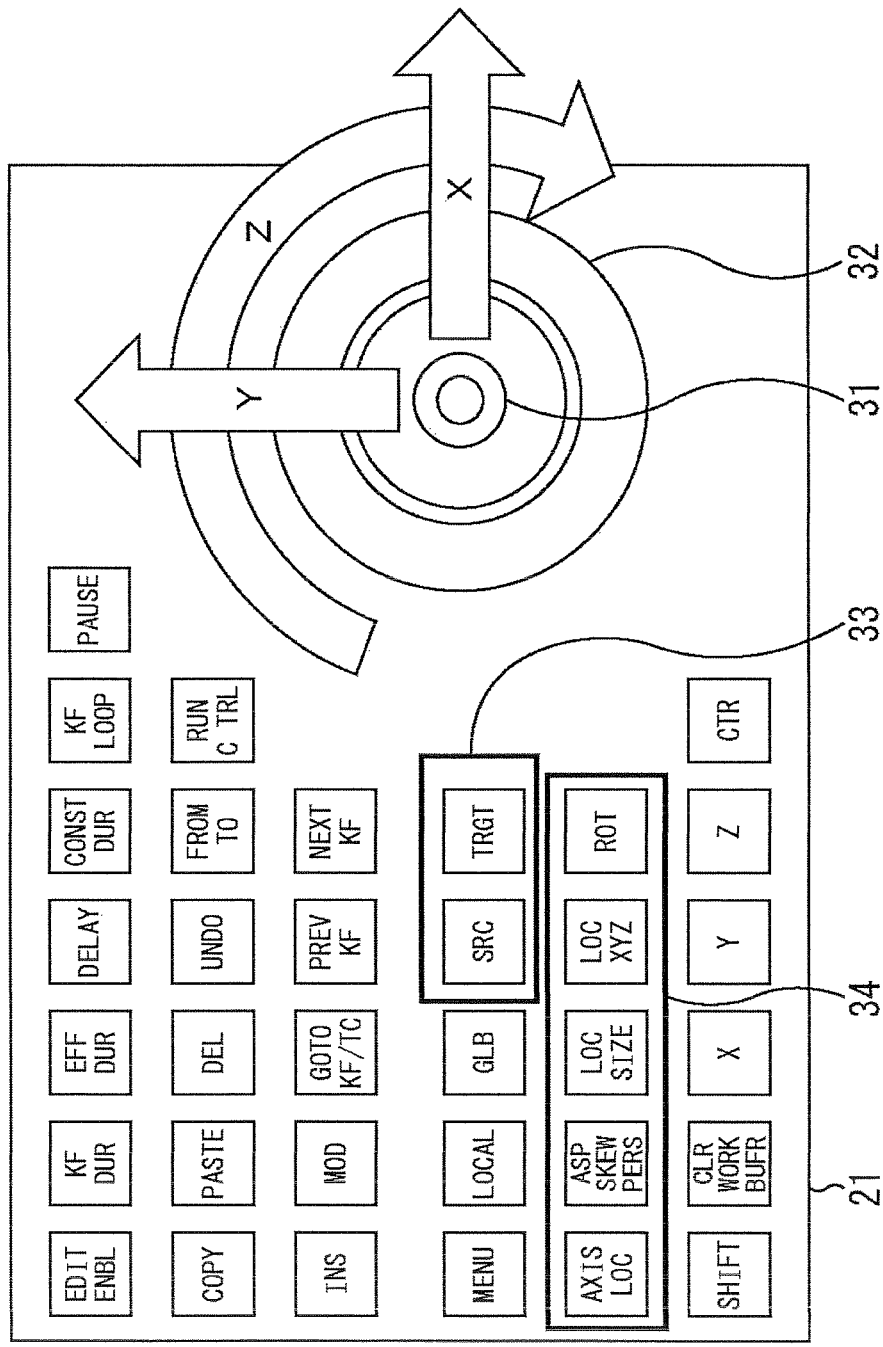
FIG. 2 is an external view showing an exemplary configuration of an operation input unit.

FIG. 1 shows an exemplary configuration of a video editing device as an embodiment.

This video editing device 10 as so-called digital special effect equipment is operated by an operator such as an editor who edits video images of television shows, for example, and is designed to be capable of controlling images of virtual three-dimensional spaces created with CG by using an operation input device such as a joystick or a trackball that is used in editing video images of television shows.

The video editing device 10 includes a CG image generating unit 11, a matrix switch 12, a user interface 13, and a broadcast video generating unit 14.

Based on CG descriptive data that is generated in advance, the CG image generating unit 11 performs real-time rendering on images of virtual three-dimensional spaces created with CG, and outputs the resultant images to the matrix switch 12, under the control of the broadcast video generating unit 14.

In accordance with a selecting operation that is input by an operator, the matrix switch 12 selectively outputs, to the broadcast video generating unit 14, some of virtual three-dimensional space images input from the CG image generating unit 11 and input images that are input from a VTR, a video server, or the like (not shown).

The user interface 13 includes an operation input unit 21, a correspondence table 22, and a display unit 23.

FIG. 3 shows an exemplary configuration of the operation input unit 21. The operation input unit 21 includes a joystick 31 and a Z-ring 32 that input parameters of the three-dimensional directions, or the x-, y-, and z-directions, and buttons (coordinate mode select buttons 33, operation mode select buttons 34, and the like) for performing various selecting operations.

An operator can perform an operation to tilt the joystick 31 right and left, to issue an instruction for movement, enlargement/reduction, rotation, or the like in the x-direction. Also, an operator can perform an operation to tilt the joystick 31 back and forth, to issue an instruction for movement, enlargement/reduction, rotation, or the like in the y-direction. Further, an operator can perform an operation to turn the joystick 31 or the Z-ring 32 clockwise and counterclockwise, to issue an instruction for movement, enlargement/reduction, rotation, or the like in the z-direction. Instead of the joystick 31, some other pointing device such as a trackball may be used.

Also, an operator can operate the coordinate mode select buttons 33 provided on the operation input unit 21, to select a target system (a screen coordinate system) or a source system (a coordinate system of a virtual object (a virtual camera or an object in a virtual three-dimensional space)) as a coordinate mode for an object to be operated with the joystick 31.

Further, an operator can operate the operation mode select buttons 34 (a Locsize button, a locxyz button, a Rot button, An Axisloc button, an asp button, and a shift button) provided on the operation input unit 21, to select Locsize, locxyz, Rot, Axisloc, asp, shift asp, or shift rot as an operation mode. It should be noted that "shift asp" means selecting the shift button and the asp button at the same time. Likewise, "shift rot" means selecting the shift button and the rot button at the same time.

The correspondence table 22 stores respective operator IDs associated with each object in a virtual three-dimensional space and a virtual camera. By associating one or more operator IDs with the joystick 31 by operating a button or the like on the operation input unit 21, one or more objects in a virtual three-dimensional space or a virtual camera can be operated with the joystick 31.

FIG. 3 shows the types of operations that are allowed or prohibited where a virtual camera or an object in a virtual three-dimensional space (hereinafter also referred to simply as an object) is associated with the joystick 31, or where the joystick 31 is to operate the virtual camera or the object.

Operations that can be performed with the joystick 31 of the operation input unit 21 include the following eight types: an enlarging/reducing operation, a three-dimensional moving operation, a rotating operation, a rotational-axis moving operation, an aspect ratio changing operation, a distortion setting operation, a perspective setting operation, and a two-dimensional moving operation. In a case where a virtual camera is to be operated, of those eight types, seven types of operations, which are the three-dimensional moving operation, the rotating operation, the rotational-axis moving operation, the aspect ratio changing operation, the distortion setting operation, the perspective setting operation, and the two-dimensional moving operation, are allowed, and the enlarging/reducing operation is prohibited.

In a case where an object is to be operated, of those eight types, three types of operations, which are the enlarging/reducing operation, the three-dimensional moving operation, and the rotating operation, are allowed, and the rotational-axis moving operation, the aspect ratio changing operation, the distortion setting operation, the perspective setting operation, and the two-dimensional moving operation are prohibited.

Any prohibited operation cannot be selected by an operator, or where a prohibited operation is selected, the CG on display is not changed even if the joystick 31 is tilted. Accordingly, while the overall operational feeling remains the same as the operational feeling of conventional digital special effect equipment, such changes as to cause problems in CG configurations are prohibited. Thus, an operator can execute editing operations, without worrying about incorrect operations.

Referring back to FIG. 1, the display unit 23 presents (displays), to an operator, the numerical value that represents the amount of movement of an object or the like in a virtual three-dimensional space. The movement occurs in accordance with an operation using the joystick 31.

The broadcast video generating unit 14 controls the CG image generating unit 11 in accordance with an operation using the operation input unit 21 of the user interface 13, to perform real-time rendering on an image of a three-dimensional virtual space created with CG, and output the resultant image to the matrix switch 12. In accordance with an editing operation that is input through the user interface 13, the broadcast video generating unit 14 also processes an image input from the matrix switch 12, and outputs the resultant image to a later stage.

A microcomputer is incorporated into each of the units from the CG image generating unit 11 to the broadcast video generating unit 14, which constitute the video editing device 10, and those units are designed to operate by exchanging control signals with one another.

[Description of Operations]

At the Time of Setting

First, CG descriptive data (Collada format) that is created in advance is read into the CG image generating unit 11, and, based on the CG descriptive data, a default Flavor is created.

Here, the CG descriptive data is created beforehand by using CG creating software, and is converted into a Collada file of the Collada format with greater versatility by the CG creating software. The CG descriptive data contains not only the Collada file but also texture data (a still image and a moving image) to be used, and a shader. Also, a Flavor is a file that stores various settings at the time of rendering a corresponding set of CG descriptive data.

After read into the CG image generating unit 11, the Collada file, the texture data, and the shader contained in the CG descriptive data are converted into a Native format and are held in an internal memory. A default Flavor is then automatically generated.

In a default Flavor, the first correspondence identification number (1), which is called a Manipulator ID, is assigned to the virtual camera to be used in CG rendering.

After that, desired Flavors can be created manually (through an operation that is input by using the operation input unit 21 of the user interface 13). In the Flavors generated here, Manipulator IDs can be set, and a virtual camera, a virtual light, or (an instance of) an object can be associated with each of the Manipulator IDs.

To perform (update) those settings, CG image generation is preferably performed at the same time. As a node (a virtual camera, a virtual light, or (an instance of) an object) indicated in the displayed list is selected, the frame surrounding the corresponding portion (which is the selected node) in the CG image being output is highlighted. As a result, the selected node becomes clear, and operability is increased.

At the Time of Operating

When a CG image output is used, an operator selects a Flavor through the user interface 13, and issues a load instruction. The CG image generating unit 11 reads the corresponding CG descriptive data (converted), and real-time rendering is started.

On the operation input unit 21, buttons each having a Manipulator ID associated therewith exist for the single joystick 31. When the operator selects one (or more) of those buttons, the node corresponding to the Manipulator ID associated with the selected button in the loaded Flavor is to be controlled through an operation of the joystick 31.

In a case where the Manipulator ID associated with the selected button is associated with a virtual camera in the Flavor, for example, the entire CG is moved in the output image in accordance with an operation performed on the joystick 31. In a case where the Manipulator ID is associated with something other than a virtual camera, the corresponding node is moved in the CG space, and rendering is performed on the result.

[Vertex Processing to Display the Same Behavior as the Behavior of Digital Special Effect Equipment]

First, an operation to be performed in a case where the Manipulator ID corresponding to a virtual camera is selected and the joystick 31 is operated is described.

FIG. 4 shows parameters that can be changed through various operations related to a virtual camera.

Each row in the drawing shows a type of control signal to be transmitted when the joystick 31 is operated in a combination of a coordinate mode and an operation mode. Each control signal shows the value indicating the type thereof, the amount of operation of a three-dimensional vector, such as a value of −10 in the x-direction. As the coordinate mode, a Src (source) system or a Tgt (target) system is selected. As the operation mode, axisloc, asp, Locsize, locxyz, Rot, shift asp, or shift rot is selected.

The respective columns of X, Y, and Z show parameters to which the control signals generated when the joystick 31 is operated are directed as instructions.

For example, in a case where a source system is selected as the coordinate mode while axisloc is selected as the operation mode, when an operator tilts the joystick 31, three-dimensional vector parameters TrnsLAxisLoc, TrnsLaxisLoc, and TrnsLaxisLoc*−1 are generated in accordance with the tilting. In a case where a target system is selected as the coordinate mode while asp is selected as the operation mode, for example, when an operator tilts the joystick 31, scalar value parameters TrnsLViewX, TrnsLViewY, and TrnsLPersZ are generated in accordance with the tilting.

To realize a behavior like that of digital special effect equipment, such as moving a virtual camera with the joystick 31 to change the screen display, the vertex coordinates that are the coordinate data of an object coordinate system need to be transformed into projection coordinates for drawing on the screen in accordance with the following equation (1):

Projection
coordinates=matFrWF2D*ProjectionMatrix*matFrWF3D*
ViewMatrix*WorldMatrix*vertex coordinates    (1)

In conventional CG, the following equation (2) is used:

Projection
coordinates=ProjectionMatrix*ViewMatrix*WorldMatrix*
vertex coordinates    (2)

Here, WorldMatrix is a matrix for transforming vertex coordinates in an object space into world space coordinates through enlargement, reduction, movement, or rotation. In the world space, the relative positions of a virtual camera, objects, and the like in the space in which drawing is to be performed are determined. WorldMatrix is determined by the setting of the CG descriptive data or a model operation.

ViewMatrix is a matrix for transforming the world coordinates into a coordinate system (view coordinates) in which the X-, Y-, and Z-axes are the rightward direction, the upward direction, and the sight-line direction of the virtual camera, respectively, with the origin being the position of the virtual camera in the CG description data. In the view coordinate system, the positions of objects relative to the virtual camera to be used for drawing are determined. The virtual camera parameters related to ViewMatrix are determined by the setting of the virtual camera in the CG descriptive data.

Here, matFrWF3D is a matrix based on a matrix for transforming vertex coordinates used in digital special effect equipment into projection coordinates. By inserting matFrWF3D between ProjectionMatrix and ViewMatrix, the operator of the video editing device 10 can add 3D transformations by digital special effect equipment to CG video images created by a CG creator. For example, the effect of a mirror placed in front of a secured camera is achieved. A scenery to which the camera is not directed (or which the CG creator does not intend to capture) can be captured through the reflection from the mirror (the effect of digital special effect equipment).

ProjectionMatrix is a matrix for transforming view coordinates into projection coordinates. The projection coordinates determine display of an object on the screen. ProjectionMatrix is determined by a viewing angle, an aspect ratio, a front clipping distance, and a back clipping distance.

Here, matFrWF2D is a matrix based on a matrix for transforming vertex coordinates used in digital special effect equipment into projection coordinates. By adding matFrWF2D after ProjectionMatrix, the operator of the video editing device 10 can add 2D transformations by digital special effect equipment to CG video images created by a CG creator.

In matFrWF3D and matFrWF2D, parameters used in conventional digital special effect equipment, and newly defined parameters are used.

The parameters used in digital special effect equipment include the following three-dimensional vectors and scalar values:

Three-Dimensional Vectors

TrnsLSrcLoc (trans-local source location), TrnsLAxisLoc (trans-local axis spin), TrnsLSrcRot (trans-local source rotation), TrnsLSrcSpin (trans-local source spin), TrnsLTgtLoc (trans-local target location), TrnsLTgtRot (trans-local target rotation), TrnsLTgtSpin (trans-local target spin), TrnsGAxisLoc (trans-global axis location), TrnsGSrcRot (trans-global source rotation), TrnsGSrcSpin (trans-global source spin), TrnsGSrcLoc (trans-global source location), TrnsGTgtLoc (trans-global target location), TrnsGTgtRot (trans-global target rotation), TrnsGTgtSpin (trans-global target spin)

Scalar Values

TrnsPreSize (trans pre size), TrnsSkewX (trans skew X), TrnsSkewY (trans skew Y), TrnsPreAspect (trans pre aspect), TrnsPreRateX (trans pre rate X), TrnsPreRateY (trans pre rate Y), TrnsLPstLocX (trans-local post location X), TrnsLPstLocY (trans-local post location Y), TrnsLPstSize (trans-local post size), TrnsLViewX (trans-local view X), TrnsLViewY (trans-local view Y), TrnsLPersZ (trans-local perspective Z), TrnsGSize (trans-global size), TrnsGPstLocX (trans-global post location X), TrnsGPstLocY (trans-global post location Y), TrnsGPstSize (trans-global post size), TrnsGViewX (trans-global view X), TrnsGViewY (trans-global view Y), TrnsGPersZ (trans-global perspective Z). The initial value of each scalar is 1, which is related to a transformation, or 0, which is related to a movement.

The newly defined parameters are zeroAxisLoc (zero axis location), ScreenZeroAxisLoc (screen zero axis location), TrnsPstRotation (trans post rotation), ScreenResolutionW (screen resolution W), and ScreenResolutionH (screen resolution H).

zeroAxisLoc: a three-dimensional vector. The central coordinates of a bounding box (a rectangular parallelepiped formed with the maximum values and the minimum values of the respective coordinate axes on which all objects and the like in the CG space exist) in the entire loaded scene (a route node). The value is assigned when a virtual camera is determined (loaded). Even if the central coordinates vary due to a movement of a moving image or an object, zeroAxis does not vary.

ScreenZeroAxisLoc: a four-dimensional vector. The projection coordinates of zeroAxis, which can be determined by ProjectionMatrix*matFrWF3D*zeroAxisLoc. Used in calculating matFrWF2D. Realizes an enlarging/reducing and rotating operation, with the center being ZeroAxisLoc in the screen.

TrnsPstRotation: a scalar value. Used in calculating matFrWF2D. The set value of a rotation angle in an rotating operation, with the center being ZeroAxisLoc in the screen.

ScreenResolutionW: a scalar value. The set value of the horizontal resolution of a video image output.

ScreenResolutionH: a scalar value. The set value of the vertical resolution of a video image output.

The arithmetic expressions of matFrWF3D, matLAxis, and matGAxis, which are matrixes of outputs, are the following arithmetic expressions (3) through (5):

$$\text{matFrWF3D} = Tpv \cdot Tgl \cdot Tga \cdot tgr \cdot Tga(-1) \cdot Tgs \cdot Tll \cdot Tla \cdot Tlr \cdot Tla(-1) \cdot Tpre \cdot Tshpre \quad (3)$$

$$\text{matLAxis} = Tpv \cdot Tgl \cdot Tga \cdot tgr \cdot Tga(-1) \cdot Tgs \cdot Tll \cdot Tla \cdot Tlr \quad (4)$$

$$\text{matGAxis} = Tpv \cdot Tgl \cdot Tga \cdot tgr \quad (5)$$

In the arithmetic expressions (3) through (5), Tgl means $T_{GLoc}$, Tga means $T_{GAxisLoc}$, tgr means $T_{GTgtSpin} \cdot T_{GRot} \cdot T_{GSreSpin}$, Tgs means $T_{GSize}$, Tll means $T_{LLOC}$, Tla means $T_{LAxisLoc}$, and Tlr means $T_{LTgtSpin} \cdot T_{LRot} \cdot T_{LSreSpin}$.

Also, Tpv is expressed as Tpv=Matrix4::translation (Vector3 (0,0,−zeroAxisLoc.z))*.

[Mathematical Formula 1]

$$\begin{pmatrix} 1 & 0 & 0 & 0 \\ 0 & 1 & 0 & 0 \\ 0 & 0 & 1 & 0 \\ -TrnsViewX * TrnsPersZ & -TrnsViewY * TrnsPersZ & TrnsPersZ & 1 \end{pmatrix} *$$

Matrix4::Translation(Vector3(0,0,zeroAxisLoc.z))

TrnsView$X$=TrnsGView$X$+TrnsLView$X$

TrnsView$Y$=TrnsGView$Y$+TrnsLView$Y$

TrnsPers$Z$={10^−5: when TrnsGPers$Z$*TrnsLLPers$Z$<=0,max(sqrt (TrnsGPers$Z$*TrnsLPers$Z$),10^−5): others}//

Here, if 10^−5 is a value close to 0 without limit, the value is not limited to that.

$T_{GLoC}$=Matrix4::translation ((TrnsGSrcLoc*TrnsGSize+TrnsGTgtLoc)*Vector3(1,1,−1))((1, 1,−1) being the values for adjusting operability)

$T_{GAxisLoc}$=Matrix4::translation (TrnsGAxisLoc*Vector3(1,1,−1))((1,1,−1) being the values for adjusting operability)

$T_{GTgtSpin}$=RotateMVE(TrnsGTgtSpin)

$T_{GSreSpin}$=RotateMVE(TrnsGSrcSpin)

$T_{GRot}$=RotateMVE(TrnsGSrcRot)*RotateMVE(TrnsGTgtRot)

$T_{GSize}$=Matrix4::scale(Vector3(TrnsGSize,TrnsGSize,1))

$T_{LLoc}$=Matrix4::translation ((TrnsLSrcLoc*TrnsPreSize+TrnsLTgtLoc)*Vector3(1,1,−1))((1,1,−1) being the values for adjusting operability)

$T_{AxisLoc}$=Matrix4::translation({TrnsLAxisLoc$X$,TrnsLAxisLoc$Y$,−TrnsLAxisLoc$Z$}) (negative Z being the value for adjusting operability)

$T_{LTgtspin}$=RotateMVE(TrnsLTgtSpin)

$T_{LSreSpin}$=RotateMVE(TrnsLSrcSpin)

$T_{LRot}$=RotateMVE(TrnsLSrcRot)*RotateMVE(TrnsLTgtRot)

[Mathematical Formula 2]

$$T_{pre} = \begin{pmatrix} aspectX * TrnsPreRateX * TrnsPreSize & TrnsSkewY * TrnsPreRateX * TrnsPreSize * aspectX & 0 & 0 \\ TrnsSkewX * TrnsPreRateY * TrnsPreSize * aspectY & TrnsPreRateY * TrnsPreSize * aspectY & 0 & 0 \\ 0 & 0 & 1 & 0 \\ 0 & 0 & 0 & 1 \end{pmatrix}$$

aspect$X$=TrnsPreAspect aspect$Y$=1/TrnsPreAspect $T_{LAxisLoc}$=Matrix4::translation(zeroAxisLoc+TrnsLAxisLoc*Vector3(1,1,−1))
$T_{GAxisLoc}$=Matrix4::translation(zeroAxisLoc+TrnsGAxisLoc*Vector3(1,1,−1))((1,1,−1) being the values for adjusting operability)

The arithmetic expression of matFrWF2D, which is a matrix of an output, is the following arithmetic expression (6):

matFrWF2D=matZeroToCENTER*

[Mathematical Formula 3]

$$\begin{pmatrix} TrnsPstSizeCos & TrnsPstSizeSinH & 0 & 0 \\ TrnsPstSizeSinW & TrnsPstSizeCos & 0 & 0 \\ 0 & 0 & 1 & 0 \\ TrnsPstLocX & TrnsPstLocY & 0 & 1 \end{pmatrix} *$$

matCenterTOZero

Matrix4matCenterTolero=Matrix4::translation(Vector3(ScreenZeroAxisLoc.x/ScreenZeroAxisLoc.w,ScreenZeroAxisLoc.y/ScreenZeroAxisLoc.w,0))

Matrix4matZeroToCenter=Matrix4::inverse(matCenterToZero)

Vector4ScreenZeroAxisLoc=ProjectionMatrix*matFrWF3D*Vector4(zeroAxisLoc.xyz,1)

TrnsPstLocX=TrnsGPstLocX+TrnsLPstLocX

TrnsPstLocY=TrnsGPstLocY+TrnsLPstLocY

TrnsPstSize=max(TrnsGPstSize*TrnsLPstSize,10^−8)

Here, if $10^{-8}$ is a value close to 0 without limit, the value is not limited to that.

TrnsPstSizeCos=TrnsPstSize*cos(TrnsPstRotation)

TrnsPstSizeSinW=TrnsPstSize*sin(TrnsPstRotation)*(ScreenResolutionH/ScreenResolutionW)

TrnsPstSizeSinH=TrnsPstSize*sin(TrnsPstRotation)*(ScreenResolutionW/ScreenResolutionH)

Next, an operation to be performed in a case where the Manipulator ID corresponding to an object is selected and the joystick 31 of the operation input unit 21 is operated is described. The results of an operation such as moving an object or the like are described.

FIG. 5 shows parameters that can be changed through various operations related to an object. Each row in the drawing shows a type of control signal to be transmitted when the joystick 31 is operated in a combination of a coordinate mode and an operation mode.

Each control signal shows the value indicating the type thereof, the amount of operation of a three-dimensional vector, such as a value of −10 in the x-direction. As the coordinate mode, a Src (source) system or a Tgt (target) system is selected. As the operation mode, axisloc, asp, Locsize, locxyz, Rot, shift asp, or shift rot is selected.

The respective columns of X, Y, and Z show to which parameters the control signals generated when the joystick 31 is operated are directed as instructions.

For example, in a case where a source system is selected as the coordinate mode and Locsize is selected as the operation mode, when the operator tilts the joystick 31 in the X-axis direction, a parameter srcMoveX, which indicates the amount of change in the X-axis direction in accordance with the tilting, is generated. Here, srcMoveX means the X component of srcMove in a later described equation. The same applies to the other axes and the other rows in the table.

In FIG. 5, there are no parameters to be associated with the items with blank columns. Therefore, any of those items cannot be selected for preventing incorrect operations, or nothing will occur even if one of those items is selected.

FIG. 6 shows the correspondence between operations for an object and movements of the object. In this drawing, each row shows an combination of a coordinate mode and an operation mode, and the respective columns of X, Y, and Z show the movements of the object caused when the joystick 31 is operated, as in FIG. 5.

In FIG. 6, the items with blank columns mean that there is no movement in the object when the joystick 31 is operated for those items. However, so as to fill the blank columns, the correspondence between the operations for the object and the movements of the object may be changed as shown in FIG. 7.

An operation performed on the joystick 31 is reflected by a CG image, as the matrix (WorldMatrix) of the respective nodes of the object is updated with the changed parameters. After the operation is reflected, the values are initialized (each of the initialized values of srcMove, srcRotate, tgtMove, and tgtRotate being 0, and each of the initialized values of srcScale and tgtScale being 1).

It should be noted that the center of "Rotate (rotation)" of an object is secured at the center of the bounding box of the object, for the sake of convenience.

[Reflecting Process]

In a case where a Src (source) system is selected as the coordinate mode, movement, enlargement/reduction, and rotation in the X-, Y-, and Z-axes in the coordinate system inherent to nodes are performed.

Matrix matMove=Matrix4::translation(SrcMove)

Matrix matScale=Matrix4::scale(SrcScale)

Matrix matRotate=Matrix4::rotation(SrcRotate)

WorldMatrix=inverse(toCenter)*matRotate*toCenter*WorldMatrix

WorldMatrix=matMove*WorldMatrix

WorldMatrix=inverse(toCenter)*matScale*toCenter*WorldMatrix

In a case where a Tgt (target) system is selected as the coordinate mode, movement, enlargement/reduction, and rotation are performed in the three axes, which are the horizontal, vertical, and sight-line directions of the display that displays a virtual three-dimensional space.

Matrix matMove=Matrix4::translation(TgtMove)

Matrix matScale=Matrix4::scale(TgtScale)

Matrix matRotate=Matrix4::rotation(TgtRotate)

matWV=inverse(ViewMatrix)*inverse(matFrWF3D)

CenterWV=inverse(matWV)*Center toCenter=Matrix4::translation(CenterWV)

WorldMatrix=matWV*inverse(toCenter)*matRotate*toCenter*inverse(matWV)*WorldMatrix WorldMatrix=matWV*matMove*inverse(matWV)*WorldMatrix WorldMatrix=matWV*fromCenter*matScale*toCenter*inverse(matWV)*WorldMatrix In an operation performed when a Manipulator ID corresponding to a virtual camera is selected, there are several processes to multiply (1, 1, −1) as the values for operability adjustment. However, in an operation performed when a Manipulator ID corresponding to an object is selected, such an adjustment is not performed.

[Display on the Display Unit 23]

The numerical value that is displayed on the display unit 23 and represents the amount of movement of an object or the like in a virtual three-dimensional space caused through an operation using the joystick 31 is calculated based on WorldMatrix.

WorldMatrix=//matrix expression

[Mathematical Formula 4]

$$\begin{pmatrix} Vector4 & Col0 \\ Vector4 & Col1 \\ Vector4 & Col2 \\ Vector4 & Col3 \end{pmatrix} // \text{four-dimensional vector} \times 4 \text{ expressions}$$

//four-dimensional vector×4 expressions

WorldMatrix'=matFrWF3D*ViewMatrix*WorldMatrix=#matrix expression

[Mathematical Formula 5]

$$\begin{pmatrix} Vector4 & Col0' \\ Vector4 & Col1' \\ Vector4 & Col2' \\ Vector4 & Col3' \end{pmatrix} // \text{four-dimensional vector} \times 4 \text{ expressions}$$

//four-dimensional vector×4 expressions

SrcScale, TgtScale, SrcMove, and TgtMove are three-dimensional vectors, and SrcRotate and TgtRotate are quaternions.

Vector3 SrcScale=Vector3(length(Col0.xyz),length(Col1.xyz),length(Col2.xyz)))

Vector3 TgtScale=matFrWF3D*ViewMatrix*SrcScale

Vector3 SrcMove=Vector3(Col3.x,Col3.y,Col3.z)

Vector3 TgtMove=matFrWF3D*ViewMatrix*SrcMove

In a case where length(Col0.xyz)>0&& length(Col1.xyz)>0&&length(Col2.xyz)>0,

Quat SrcRotate=normalize(Quat(Vector3(normalize(Col0.xyz),normalize(Col1.xyz),normalize(Col2.xyz))))

Quat TgtRotate=normalize(Quat(Vector3(normalize(Col0'.xyz),normalize(Col1'.xyz),normalize(Col2'.xyz))))

In cases other than the above,

Quat SrcRotate={0,0,0,1}

Quat TgtRotate={0,0,0,1}

[Description of Functions and Formats]

The functions and formats used in the above descriptions are now described.

Vector3 is a three-dimensional vector, and is formed with three kinds of scalar values. The respective scalar values are referred to as x, y, and z.

Vector4 is a four-dimensional vector, and is formed with four kinds of scalar values. The respective scalar values are referred to as x, y, z, and w.

Matrix is a 4×4 matrix, and is formed with 16 kinds of scalar values.

Quat is a quaternion, and is formed with four kinds of scalar values. The respective scalar values are referred to as x, y, z, and w.

Vector4 v4 v4.xyz means a transformation into a three-dimensional vector having x, y, and z values of a four-dimensional vector.

v4.x means a transformation into a scalar value having an x value of a four-dimensional vector. The same applies to v4.y and the like. The same also applies to Vector3.

length(Vector3) is a function to output the length of a vector.

normalize(Vector3) is a function to output a normalized vector.

normalize(Quat) is a function to output a normalized quaternion.

inverse( ) means an inverse matrix.

---

Matrix RotateMVE (Vector3 R) is for generating a rotation matrix of digital special effect equipment, or for generating a matrix for rotation in the following order: the Y-axis, the X-axis, and the Z-axis. R* = {1, 1, −1} are values for operability adjustment.

Matrix RotateMVE (Vector3 R) {
Return

[Mathematical Formula 6]

$$\begin{pmatrix} \cos(R,x)*\cos(R,y)+\sin(R,z)*\sin(R,y)*\sin(R,x) & \sin(R,z)*\cos(R,x) & -\cos(R,z)*\sin(R,y)+\sin(R,z)*\cos(R,y)*\sin(R,x) & 0 \\ -\sin(R,z)*\cos(R,y)+\cos(R,z)*\sin(R,y)*\sin(R,x) & \cos(R,z)*\cos(R,x) & \sin(R,z)*\sin(R,y)+\cos(R,z)*\cos(R,y)*\sin(R,x) & 0 \\ \sin(R,y)*\cos(R,x) & -\sin(R,x) & \cos(R,y)*\cos(R,x) & 0 \\ 0 & 0 & 0 & 1 \end{pmatrix};$$

}

Matrix Matrix4::scale (Vector3 S) is for generating a matrix for enlargement/reduction.

Matrix Matrix4::scale (Vector3 S) {
Return

[Mathematical Formula 7]

$$\begin{pmatrix} S,x & 0 & 0 & 0 \\ 0 & S,y & 0 & 0 \\ 0 & 0 & S,z & 0 \\ 0 & 0 & 0 & 1 \end{pmatrix};$$

}
Matrix Matrix4::translation (Vector3 T) is for generating a matrix for movement.
Matrix Matrix4::translation (Vector3 T) {
Return

[Mathematical Formula 8]
$$\begin{pmatrix} 0 & 0 & 0 & 0 \\ 0 & 0 & 0 & 0 \\ 0 & 0 & 0 & 0 \\ T,x & T,y & T,z & 1 \end{pmatrix};$$

}
Matrix Matrix4::rotation (Vector3 R) is for generating a rotation matrix that is a matrix for rotation in the following order: the X-axis,
the Y-axis, and the Z-axis.
Matrix Matrix4::rotation (Vector3 R) {
Return

[Mathematical Formula 9]
$$\begin{pmatrix} \cos(R,z) & \sin(R,z) & 0 & 0 \\ -\sin(R,z) & \cos(R,z) & 0 & 0 \\ 0 & 0 & 1 & 0 \\ 0 & 0 & 0 & 1 \end{pmatrix} * \begin{pmatrix} \cos(R,y) & 0 & -\sin(R,y) & 0 \\ 0 & 1 & 0 & 0 \\ \sin(R,y) & 0 & \cos(R,y) & 0 \\ 0 & 0 & 0 & 1 \end{pmatrix} * \begin{pmatrix} 1 & 0 & 0 & 0 \\ 0 & \cos(R,x) & -\sin(R,x) & 0 \\ 0 & \sin(R,x) & \cos(R,x) & 0 \\ 0 & 0 & 0 & 1 \end{pmatrix};$$

}

The differences between a case where a source (Src) system is selected as the coordinate mode and a case where a target (Tgt) system is selected as the coordinate mode are as follows. A source system is a coordinate system based on an object or the like to be operated, and is a coordinate system that changes the orientation thereof in relation to the appearance of an output image when the object changes the orientation thereof.

For example, in a case where the traveling direction of a vehicle as a vehicle-shaped object is the x-axis, the x-axis is always the traveling direction of the vehicle even if the vehicle faces any direction in a CG virtual space. Accordingly, when the joystick 31 is tilted in the x-direction so as to move (Translate) the object, movement in the traveling direction of the vehicle is achieved.

Meanwhile, a target system is a coordinate system based on the appearance of an output image, and the coordinate axes do not vary no matter how the object or the like is operated, with the x-axis being the apparent right (for example). When the joystick 31 is tilted in the x-direction so as to move the object by using a target coordinate system, the object always moves to the apparent right. If the object has a shape of a vehicle, the object invariably moves to the apparent right, regardless of directions such as rightward, upward, and downward directions with respect to the vehicle.

[Examples of Screen Displays]

Next, the effects of CG control performed by the video editing device 10 are described.

Figure 8:
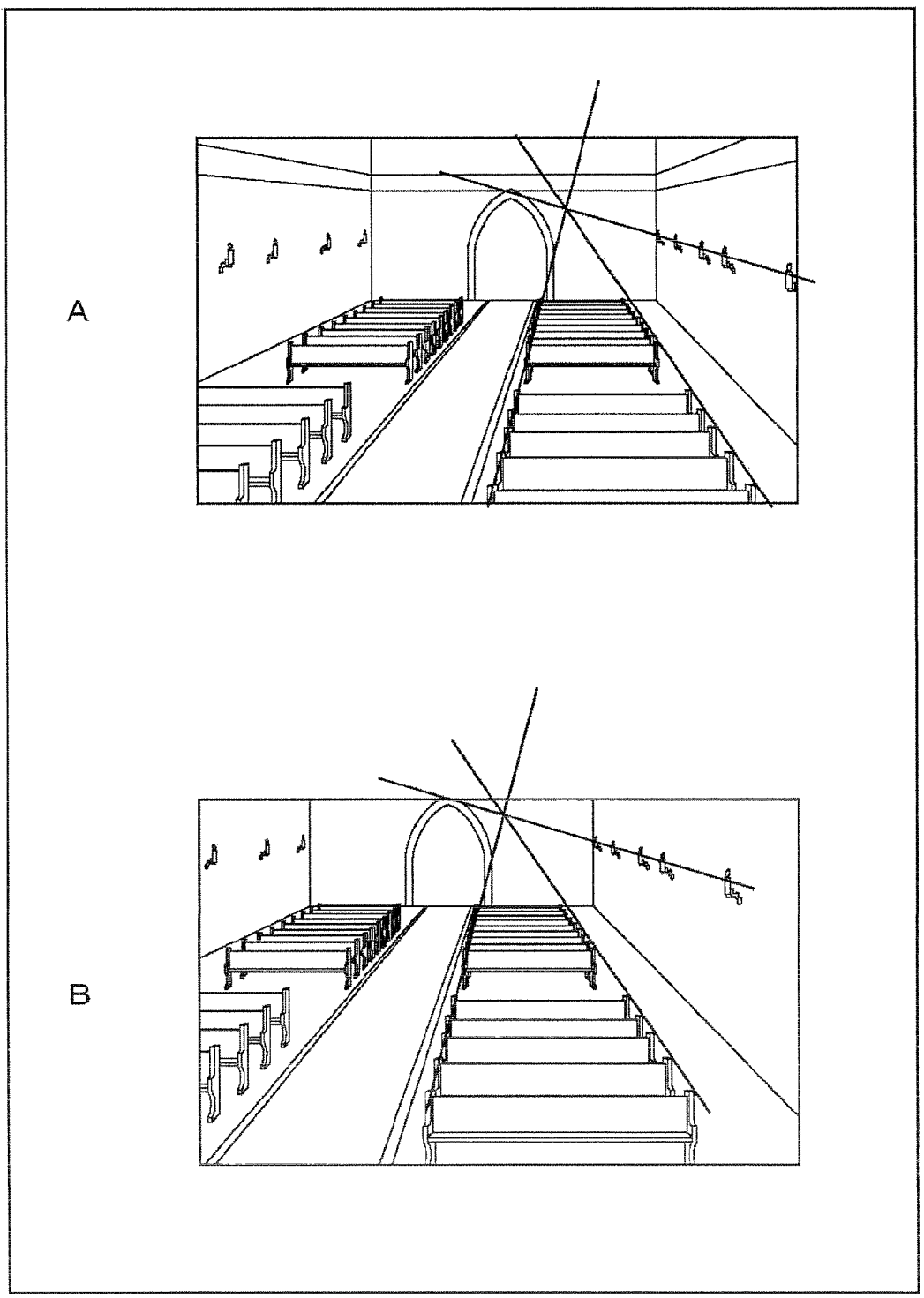
FIG. 8 is a diagram showing exemplary screen displays for explaining a two-dimensional moving operation performed by changing TrnsPstLocX and TrnsPstLocY in matFrWF2D.

FIG. 8 shows exemplary screen displays for explaining the effects of a two-dimensional moving operation performed on a CG three-dimensional virtual space, or changes of TrnsPstLocX and TrnsPstLocY in matFrWF2D. Drawing A shows the state prior to the operation, and drawing B shows the state after the operation.

As is apparent from a comparison between the drawing A and the drawing B, the position of the vanishing point in the three-dimensional virtual space is the same in the drawing A and the drawing B, and the drawing B is a drawing formed by moving the drawing A two-dimensionally upward. Conventionally, it was not possible to perform a two-dimensional moving operation for such a three-dimensional virtual space.

Figure 9:
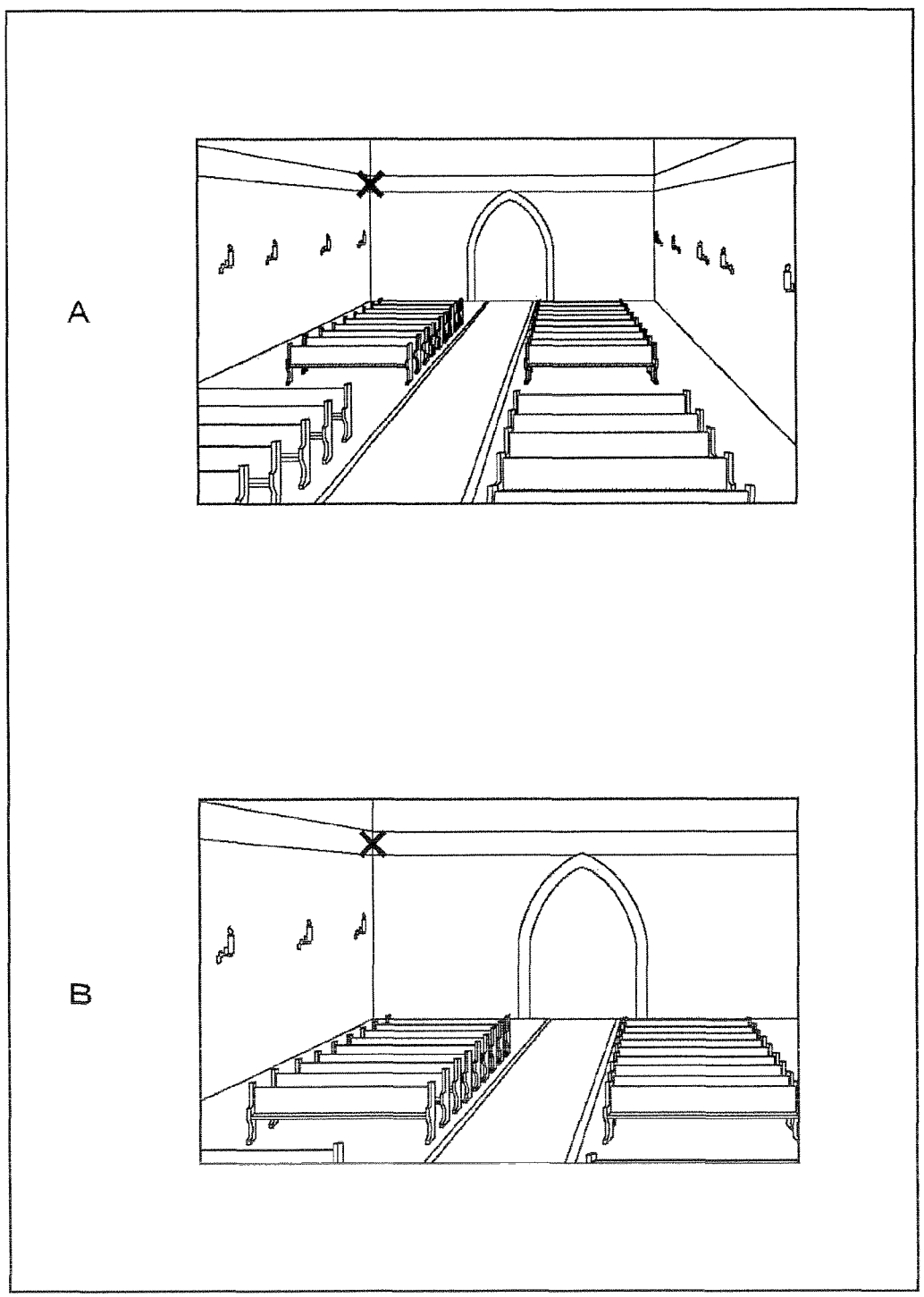
FIG. 9 is a diagram showing exemplary screen displays for explaining an enlarging operation performed by changing TrnsPstSize in matFrWF2D.

FIG. 9 shows exemplary screen displays for explaining the effects of an enlarging operation performed on a CG three-dimensional virtual space, or a change of TrnsPstSize in matFrWF2D. Drawing A shows the state prior to the operation, and drawing B shows the state after the operation.

As is apparent from a comparison between the drawing A and the drawing B, the entire image is enlarged without a change of the position of an arbitrary reference point (shown as the cross in the upper left portion in the screen in this case). Conventionally, it was not possible to perform an enlarging operation, with such an arbitrary position being a reference point.

FIG. 10 shows exemplary screen displays for explaining the effects of a rotating operation performed on a CG three-dimensional virtual space, or a change of TrnsPstRotation in matFrWF2D. Drawing A shows the state prior to the operation, and drawing B shows the state after the operation.

As is apparent from a comparison between the drawing A and the drawing B, the entire image is enlarged in an arbitrary direction (clockwise in this example), with the center being an arbitrary point (the cross in the upper left portion in the screen in this case). Conventionally, it was not possible to perform such a rotating operation, with the center being an arbitrary point.

By combining the two-dimensional movement, enlargement, and rotation illustrated in FIGS. 8 through 10, it is possible to cope with a multiscreen that displays different video images that are spatially continuous on different monitors.

Figure 11:
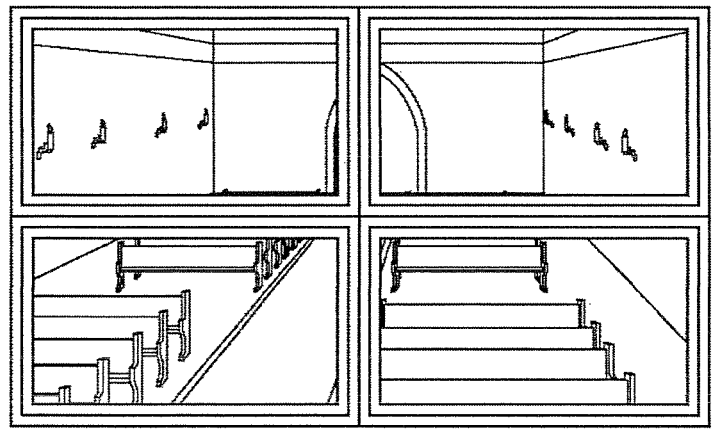
FIG. 11 is a diagram showing an exemplary multiscreen display.

FIG. 11 shows a situation where a video image of a three-dimensional virtual space is vertically and horizontally divided into four, and is displayed on four monitors that are of the same size and are vertically and horizontally arranged.

Figure 12:
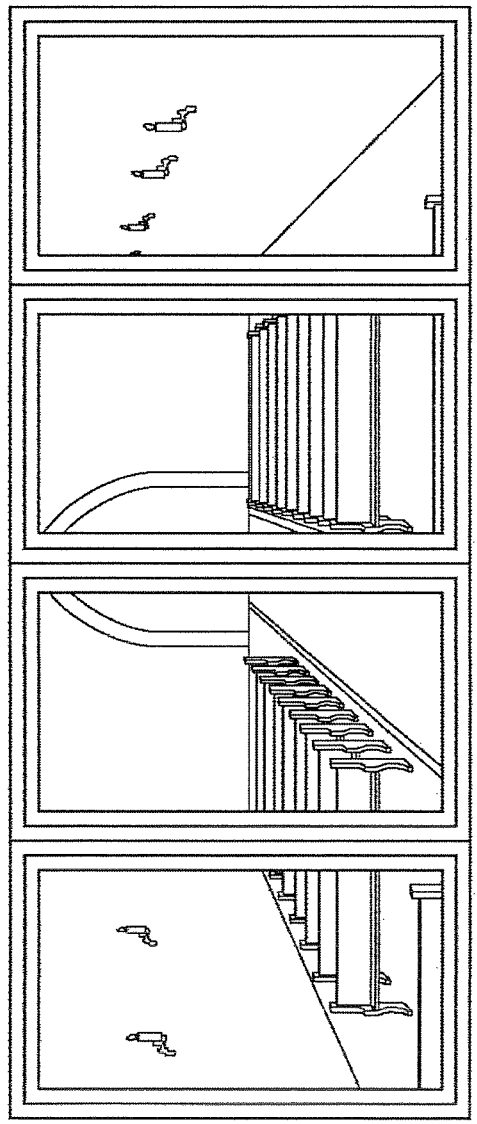
FIG. 12 is a diagram showing an exemplary multiscreen display.

FIG. 12 shows a situation where a video image of a three-dimensional virtual space is divided into four portions in the vertical direction, and is displayed on four monitors that are of the same size and are arranged in parallel.

Figure 13:
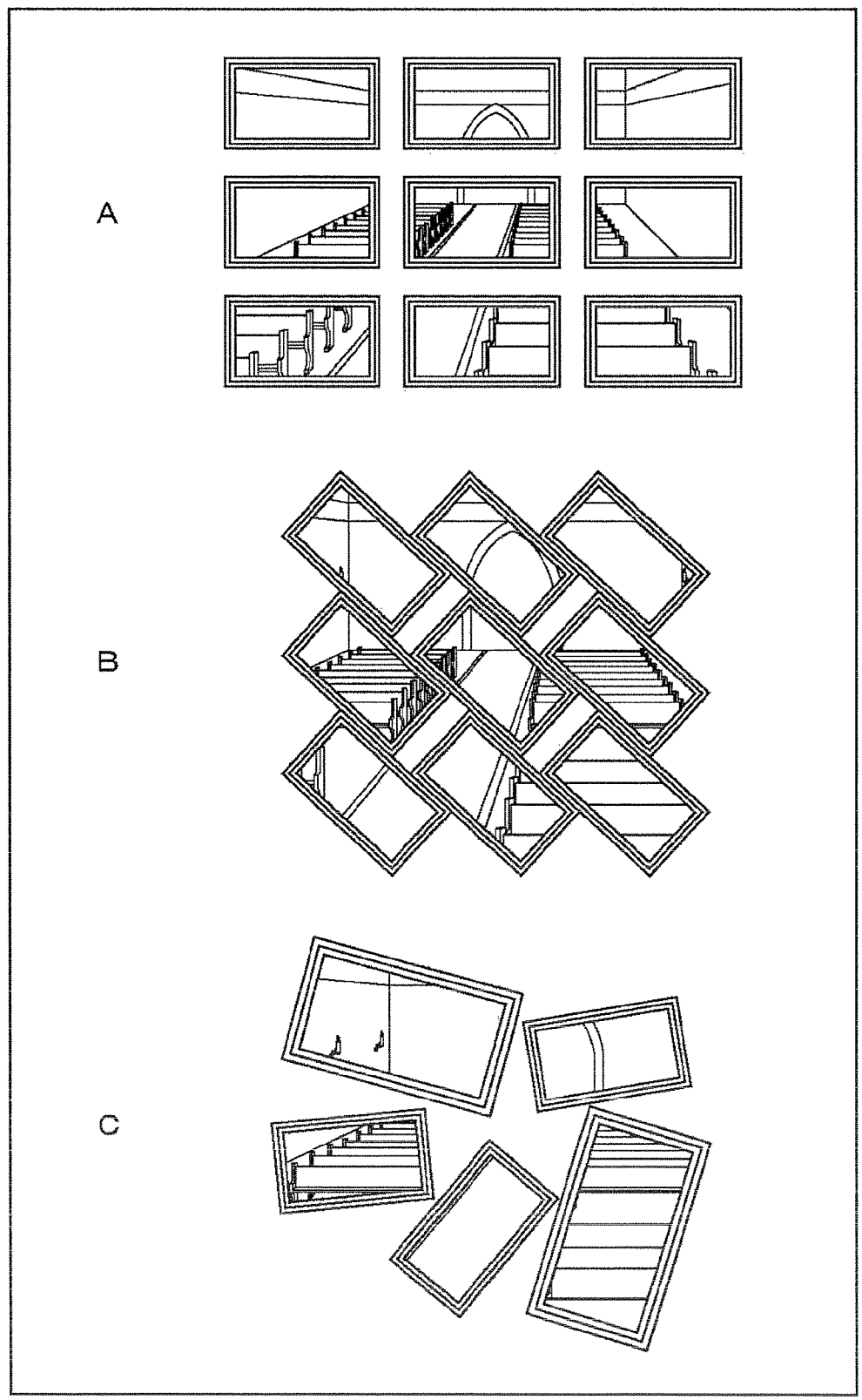
FIG. 13 is a diagram showing exemplary multiscreen displays.

FIG. 13 shows exemplary multiscreen displays using more monitors than the above. Specifically, drawing A shows a situation where divisional video images are displayed on monitors that are of the same size and are arranged in a 3×3 fashion. Drawing B shows a situation where divisional video images are displayed on monitors that are of the same size and are arranged in a tilted 3×3 fashion. Drawing C shows a situation where divisional video images are displayed on monitors that are of different sizes and are randomly arranged. In a case where monitors with different aspect ratios are made to coexist, the matrix settings of ProjectionMatrix should be adjusted.

Figure 14:
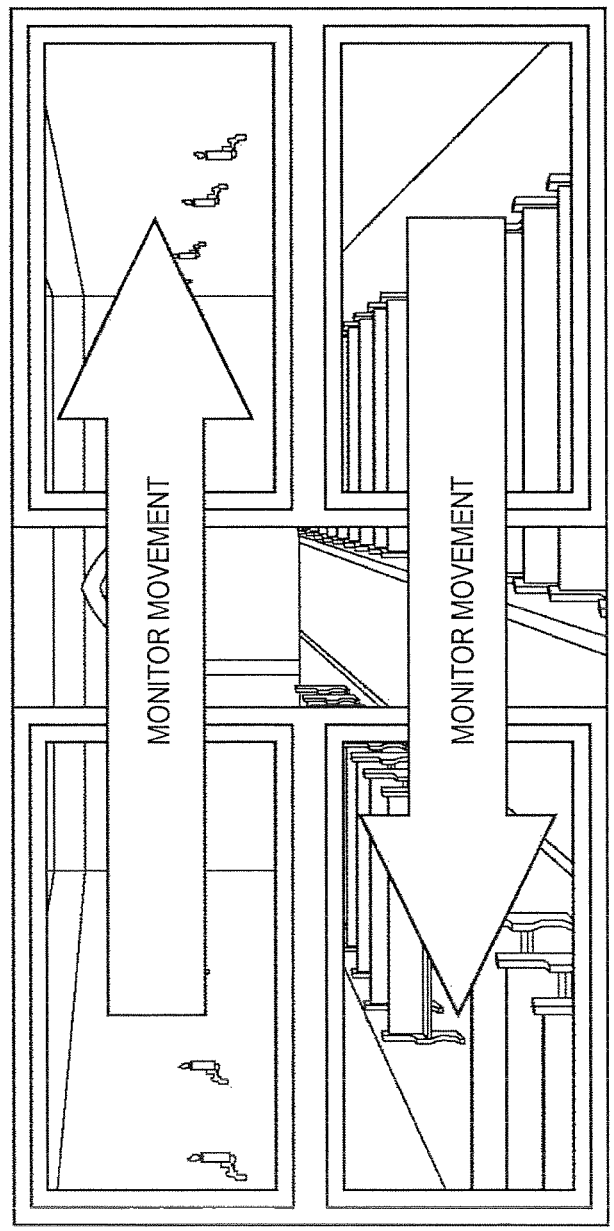
FIG. 14 is a diagram showing an exemplary multiscreen display.

FIG. 14 shows an example of use in a case where two monitors arranged in the vertical direction are set in such a state as to be movable in the horizontal direction independently of each other. By changing the parameters of matFrWF2D in accordance with the horizontal movements of the monitors, it is possible to display an image on a monitor moving in a three-dimensional virtual space.

[Modifications]

Operations using the joystick 31 of the operation input unit 21 can be extended so as to cope not only with the above described movements and rotations but also with CG stereo image processing.

Specifically, an operation to adjust the distance between a virtual camera for the left eye and a virtual camera for the right eye, an operation to adjust the angle of convergence, and the like are added. In this case, when the joystick 31 is tilted forward, for example, the point of regard is moved further away (the angle of convergence is narrowed). When the joystick 31 is tilted backward, the point of regard is moved closer (the angle of convergence is widened). When the joystick 31 is tilted to the left, the distance between the left eye and the right eye is shortened. When the joystick 31 is tilted to the right, the distance between the left eye and the right eye becomes longer.

The matrix switch 12 may be controlled through the user interface 13 so that control signals are transmitted from the user interface 13 to the matrix switch 12 in accordance with operations by an operator.

Although the broadcast video generating unit 14 controls the CG image generating unit 11 in this embodiment, the CG image generating unit 11 may be controlled directly through the user interface 13.

Also, the CG image generating unit 11 may include an image input terminal that receives an image signal from outside, and may incorporate the input image (a video signal) into CG or an output image by performing texture mapping. Here, as the input image, an output from the matrix switch 12 may be received, or one of the outputs from the broadcast video generating unit 14 may be received. In a case where an image is incorporated into a plane in CG by texture mapping, and the object containing the plane is an object corresponding to a Manipulator ID in a Flavor, the input image subjected to the texture mapping also moves with the object through an operation of the joystick 31.

Further, the contents of the texture mapping may be controlled through the user interface 13. The information indicating which input image is to be used when image inputs are provided for the CG image generating unit 11, the information indicating to which plane the texture mapping is to be directed, and the like are stored in the Flavor, so that the information can be reproduced when the Flavor is loaded.

As a component of the video editing device 10, digital special effect equipment may be further provided, and (the channel of) the digital special effect equipment may be included in the objects to be selected in accordance with a Manipulator ID or an operator for selecting the Manipulator ID. Through such a selecting operation, the joystick 31 can also serve as a CG operating device or a device for operating the digital special effect equipment.

Further, as components of the video editing device 10, digital special effect equipment or CG image generating units 11 may be provided so that one of those equipment and units can be selected. In this manner, one of those equipment and units can be operated with the joystick 31. Further, two or more of those equipment and units may be selected, so that an operation of the joystick 31 can control two or more of those equipment and units. For example, a CG image and an image of digital special effect equipment are simultaneously moved, and those images are superimposed or combined by the broadcast video generating unit, to obtain one output.

In any of the above described cases, the image signal path can be arbitrarily changed by controlling the matrix switch 12, so as to determine which output of which device is to be used where.

Further, the user interface 13 may be designed to be able to cope with not only with a virtual camera and objects in a virtual three-dimensional space generated by the CG image generating unit 11, but also with digital special effect equipment that enlarges and reduces video images.

It should be noted that the above described series of processes can be performed by hardware or software. In a case where the series of processes are performed by software, a computer into which the program for realizing the software is incorporated is used, or the program for realizing the software is installed from a program recording medium into a general-purpose personal computer that can execute various kinds of functions by installing various kinds of programs.

It should be noted that the above described series of processes can be performed by hardware or software. In a case where the series of processes are performed by software, a computer into which the program for realizing the software is incorporated is used, or the program for realizing the software is installed from a program recording medium into a general-purpose computer that can execute various kinds of functions by installing various kinds of programs.

Figure 15:
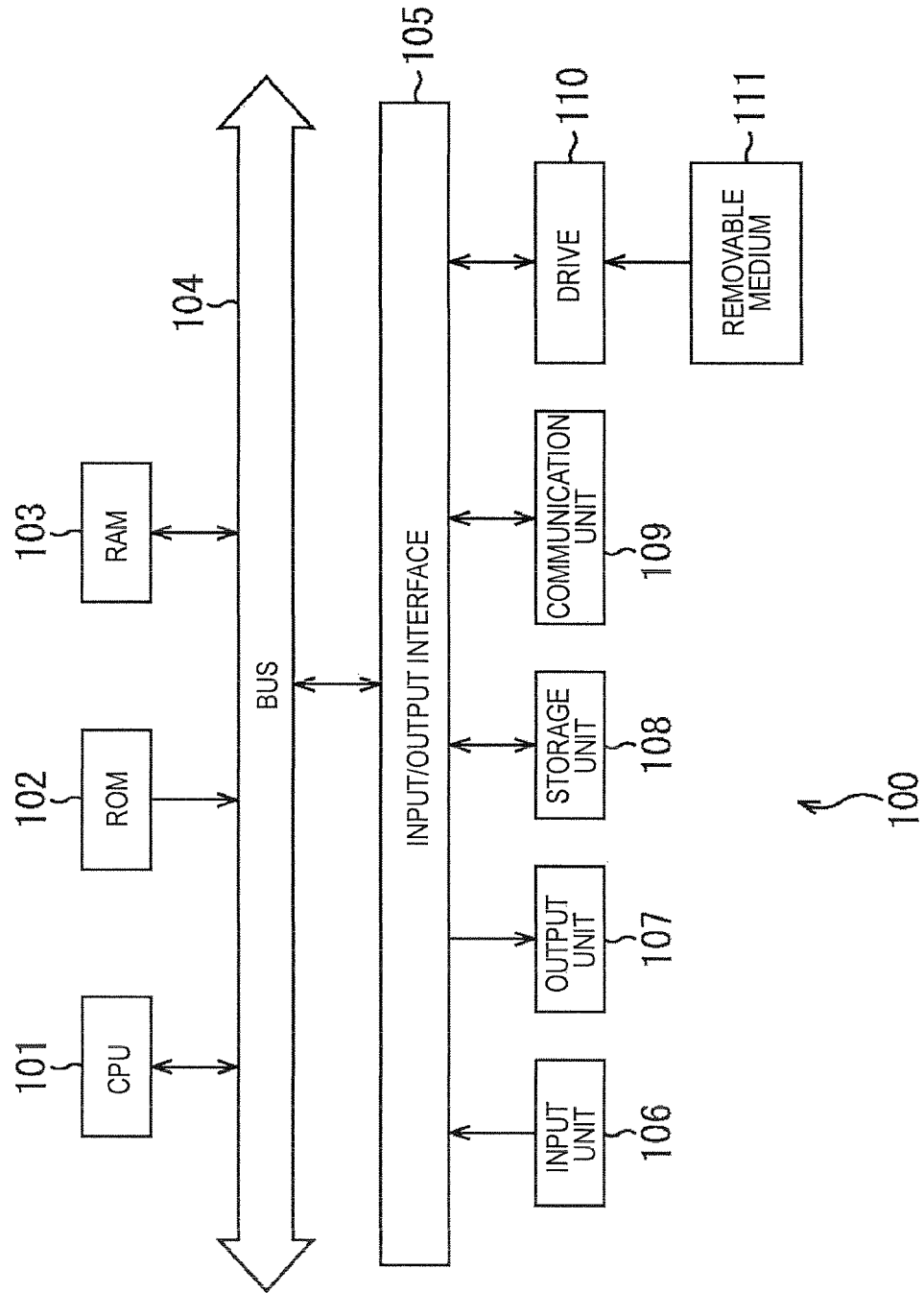
FIG. 15 is a block diagram showing an exemplary configuration of a computer.

FIG. 15 is a block diagram showing an example hardware configuration of a computer that performs the above described series of processes in accordance with a program.

In this computer 100, a CPU (Central Processing Unit) 101, a ROM (Read Only Memory) 102, and a RAM (Random Access Memory) 103 are connected to one another by a bus 104.

An input/output interface 105 is further connected to the bus 104. The following components are connected to the input/output interface 105: an input unit 106 formed with a keyboard, a mouse, a microphone, and the like, an output unit 107 formed with a display, a speaker, and the like, a storage unit 108 formed with a hard disk, a nonvolatile memory, or the like, a communication unit 109 formed with a network interface or the like, and a drive 110 for driving a removable medium 111 such as a magnetic disk, an optical disk, a magnetooptical disk, a semiconductor memory, or the like.

In the computer 100 having the above configuration, the CPU 101 loads a program stored in the storage unit 108 into the RAM 103 via the input/output interface 105 and the bus 104, and executes the program, to perform the above described series of processes.

The program to be executed by the computer may be a program for carrying out processes in chronological order in accordance with the sequence described in this specification, or a program for carrying out processes in parallel or whenever necessary such as in response to a call.

Also, the program may be executed by one computer, or may be executed by two or more computers in a distributed manner. Further, the program may be transferred to a remote computer and be executed there.

In this specification, a system means an entire apparatus formed with more than one device.

It should be noted that embodiments in this disclosure are not limited to the above described embodiment, and various modifications may be made without departing from the scope of the disclosure.

REFERENCE SIGNS LIST

10 Video editing device, 11 CG image generating unit, 12 Matrix switch, 13 User interface, 14 Broadcast video generating unit, 21 Operation input unit, 22 Correspondence table, 23 Display unit, 31 Joystick, 32 Z-ring, 33 Coordinate mode select buttons, 34 Operation mode select buttons

The invention claimed is:

1. An information processing device comprising:
a computer graphics (CG) image generating unit configured to perform real-time rendering of a CG image, based on CG descriptive data defining contents of a virtual three-dimensional space formed with CG;
a three-dimensional operating unit configured to be used for inputting parameters of three axial directions perpendicular to one another for performing a set of predetermined operations on a virtual camera and on an object in the virtual three-dimensional space;
an associating unit configured to provide an ID identifying the virtual camera and to provide an ID identifying the object in the virtual three-dimensional space, the associating unit being responsive to the selection of a provided ID to determine an object to be controlled such that the selection of the virtual camera ID selects the virtual camera as the object to be controlled with the three-dimensional operating unit and the selection of the object ID selects the object in the virtual three-dimensional space as the object to be controlled with the three-dimensional operating unit;
a coordinate mode selecting unit configured to select a target system or a source system as a coordinate mode indicating a coordinate system of an operation using the three-dimensional operating unit; and
a control unit configured to, in response to the input of the parameters of the three axial directions through the three-dimensional operating unit, control the CG image generating unit to cause an image of the virtual three-dimensional space to vary in response to one set of instructions when the virtual camera is selected as the object to be controlled with the three-dimensional operating unit and in response to another set of instructions when the object in the virtual three-dimensional space is selected as the object to be controlled with the three-dimensional operating unit, the variation in the image of the virtual three-dimensional space being caused by changing the amount of control of the CG image generating unit in accordance with the input parameters, and wherein the one set of instructions allows some of the predetermined operations in the set to be performed on the virtual camera and prohibits others of the predetermined operations, and wherein the other set of instructions allows at least the prohibited operations in the set to be performed on the object in the virtual three-dimensional space.

2. The information processing device according to claim 1, wherein, in response to the input of the parameters of the three axial directions through the three-dimensional operating unit, the control unit controls the CG image generating unit to cause the image of the virtual three-dimensional space to vary by reversing the sign of the amount of control of the CG image generating unit in accordance with the input parameters.

3. The information processing device according to claim 1, further comprising
an operation mode selecting unit configured to select, as an operation mode using the three-dimensional operating unit, Locsize, locxyz, Rot, Axisloc, asp, shift asp, or shift rot.

4. The information processing device according to claim 1, further comprising
a presenting unit configured to show an operator the amount of control corresponding to the parameters input through the three-dimensional operating unit.

5. The information processing device according to claim 1, wherein the three-dimensional operating unit serves as a user interface of digital special effect equipment.

6. An information processing method to be performed by an information processing device that includes:
a computer graphics (CG) image generating unit that performs real-time rendering of a CG image, based on CG descriptive data defining contents of a virtual three-dimensional space formed with CG; and
a three-dimensional operating unit for inputting parameters of three axial directions perpendicular to one another for performing a set of predetermined operations on a virtual camera and on an object in the virtual three-dimensional space,
the information processing method comprising:
a providing an ID identifying the virtual camera and providing an ID identifying the object in the virtual three-dimensional space;
determining an object to be controlled in response to the selection of a provided ID such that the selection of the virtual camera ID selects the virtual camera as the object to be controlled with the three-dimensional operating unit and the selection of the object ID selects the object in the virtual three-dimensional space as the object to be controlled with the three-dimensional operating unit;
a coordinate mode selecting step of selecting a target system or a source system as a coordinate mode indicating a coordinate system of an operation using the three-dimensional operating unit; and
a control step of, in response to the input of the parameters of the three axial directions through the three-dimensional operating unit, controlling the CG image generating unit to cause an image of the virtual three-dimensional space to vary in response to one set of instructions when the virtual camera is selected as the object to be controlled with the three-dimensional operating unit and in response to another set of instructions when the object in the virtual three-dimensional space is associated as the object to be controlled with the three-dimensional operating unit, the variation in the image of the virtual three-dimensional space being caused by changing the amount of control of the CG image generating unit in accordance with the input parameters, and wherein the one set of instructions allows some of the predetermined operations in the set to be performed on the virtual camera and prohibits others of the predetermined operations, and wherein the other set of instructions allows at least the prohibited operations in the set to be performed on the object in the virtual three-dimensional space.

7. A non-transitory computer-readable medium on which is stored a program for causing a computer to function as:
- a computer graphics (CG) image generating unit configured to perform real-time rendering of a CG image, based on CG descriptive data defining contents of a virtual three-dimensional space formed with CG;
- a three-dimensional operating unit configured to be used for inputting parameters of three axial directions perpendicular to one another for performing a set of predetermined operations on a virtual camera and on an object in the virtual three-dimensional space;
- an associating unit configured to provide an ID identifying the virtual camera and to provide an ID identifying the object in the virtual three-dimensional space, the associating unit being responsive to the selection of a provided ID to determine an object to be controlled such that the selection of the virtual camera ID selects the virtual camera as the object to be controlled with the three-dimensional operating unit and the selection of the object ID selects the object in the virtual three-dimensional space as the object to be controlled with the three-dimensional operating unit;
- a coordinate mode selecting unit configured to select a target system or a source system as a coordinate mode indicating a coordinate system of an operation using the three-dimensional operating unit; and
- a control unit configured to, in response to the input of the parameters of the three axial directions through the three-dimensional operating unit, control the CG image generating unit to cause an image of the virtual three-dimensional space to vary in response to one set of instructions when the virtual camera is selected as the object to be controlled with the three-dimensional operating unit and in response to another set of instructions when the object in the virtual three-dimensional space is selected as the object to be controlled with the three-dimensional operating unit, the variation in the image of the virtual three-dimensional space being caused by changing the amount of control of the CG image generating unit in accordance with the input parameters, and wherein the one set of instructions allows some of the predetermined operations in the set to be performed on the virtual camera and prohibits others of the predetermined operations, and wherein the other set of instructions allows at least the prohibited operations in the set to be performed on the object in the virtual three-dimensional space.

* * * * *